(12) United States Patent
Chevrette et al.

(10) Patent No.: US 8,510,732 B2
(45) Date of Patent: Aug. 13, 2013

(54) DISTRIBUTED ASSET MANAGEMENT SYSTEM AND METHOD

(75) Inventors: Guy Chevrette, Ville-St-Laurent (CA); Yanick Duchesne, Deux-Montagnes (CA)

(73) Assignee: Connectif Solutions Inc., Montreal, Quebec (CA)

( * ) Notice: Subject to any disclaimer, the term of this patent is extended or adjusted under 35 U.S.C. 154(b) by 1062 days.

(21) Appl. No.: 11/816,872

(22) PCT Filed: Feb. 21, 2006

(86) PCT No.: PCT/CA2006/000257
§ 371 (c)(1),
(2), (4) Date: Jul. 25, 2008

(87) PCT Pub. No.: WO2006/089411
PCT Pub. Date: Aug. 31, 2006

(65) Prior Publication Data
US 2009/0007098 A1    Jan. 1, 2009

Related U.S. Application Data

(60) Provisional application No. 60/655,089, filed on Feb. 22, 2005.

(51) Int. Cl.
*G06F 9/445* (2006.01)
(52) U.S. Cl.
USPC .............................. 717/177; 717/176; 717/174
(58) Field of Classification Search
USPC ........................................................ 717/177
See application file for complete search history.

(56) References Cited

U.S. PATENT DOCUMENTS

| | | | |
|---|---|---|---|
| 6,112,246 A | 8/2000 | Horbal et al. | 709/230 |
| 6,757,714 B1 | 6/2004 | Hansen | 709/206 |
| 6,768,994 B1 | 7/2004 | Howard et al. | 707/10 |
| 7,882,122 B2 * | 2/2011 | Wong | 707/760 |
| 2002/0111924 A1 * | 8/2002 | Lewis | 705/413 |
| 2002/0133504 A1 | 9/2002 | Vlahos et al. | 707/104.1 |
| 2003/0177279 A1 | 9/2003 | Evans | 709/315 |

(Continued)

FOREIGN PATENT DOCUMENTS

| | | |
|---|---|---|
| WO | WO 2004/086160 | 10/2004 |
| WO | WO 2004/102438 | 11/2004 |

OTHER PUBLICATIONS

International Search Report, International Application No. PCT/CA2006/000257, International Searching Authority, Jun. 12, 2006, 2 pages.
International Preliminary Report of Patentability, International Application No. PCT/CA2006/000257, The International Bureau of WIPO, Aug. 28, 2007, 8 pages.

(Continued)

*Primary Examiner* — Matt Kim
*Assistant Examiner* — Hua Lu
(74) *Attorney, Agent, or Firm* — Roberts & Roberts, LLP

(57) ABSTRACT

The present invention provides a method and system for managing remote applications running on devices that acquire, process and store data locally in order to integrate said data with heterogeneous enterprise information systems and business processes. The system allows for remotely deploying, running, monitoring and updating of applications embedded within devices. The applications acquire, store and process data about assets that is eventually sent to a centralized data processing infrastructure. The system comprises an information integration framework that integrates the processed data with data that is extracted from heterogeneous data sources, in real-time, in order to create synthesized information.

10 Claims, 7 Drawing Sheets

Relationships from microkernel to device (UML class diagram)

(56) References Cited

U.S. PATENT DOCUMENTS

| | | | |
|---|---|---|---|
| 2004/0024644 A1* | 2/2004 | Gui et al. | 705/22 |
| 2004/0024660 A1* | 2/2004 | Ganesh et al. | 705/28 |
| 2004/0249919 A1* | 12/2004 | Mattheis | 709/223 |
| 2005/0027846 A1 | 2/2005 | Wolfe et al. | 709/223 |
| 2009/0312052 A1* | 12/2009 | Barbosa et al. | 455/556.1 |
| 2011/0047170 A1* | 2/2011 | Thomas et al. | 707/756 |

OTHER PUBLICATIONS

Australian Patent Office, Examiner's Report No. 2 on Patent Application No. 2006217563, dated Nov. 12, 2010 (3 pages).

Japanese Patent Office, Examiner's Report—International Application No. 2007-556470, dated Nov. 11, 2011 (7 pages) [English Translation].

\* cited by examiner

Fig. 1: Relationships from microkernel to device (UML class diagram)
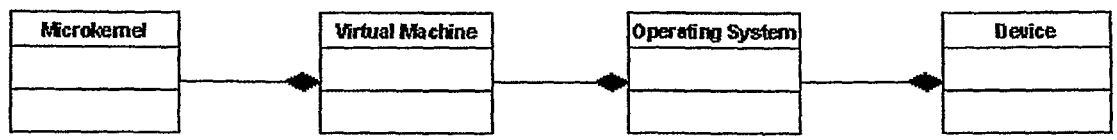
Fig. 2: Embedded applications and devices (UML component diagram)
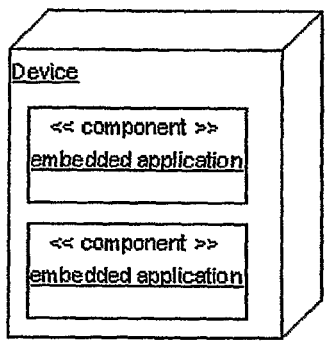
Fig. 3: Management infrastructure (UML component diagram)
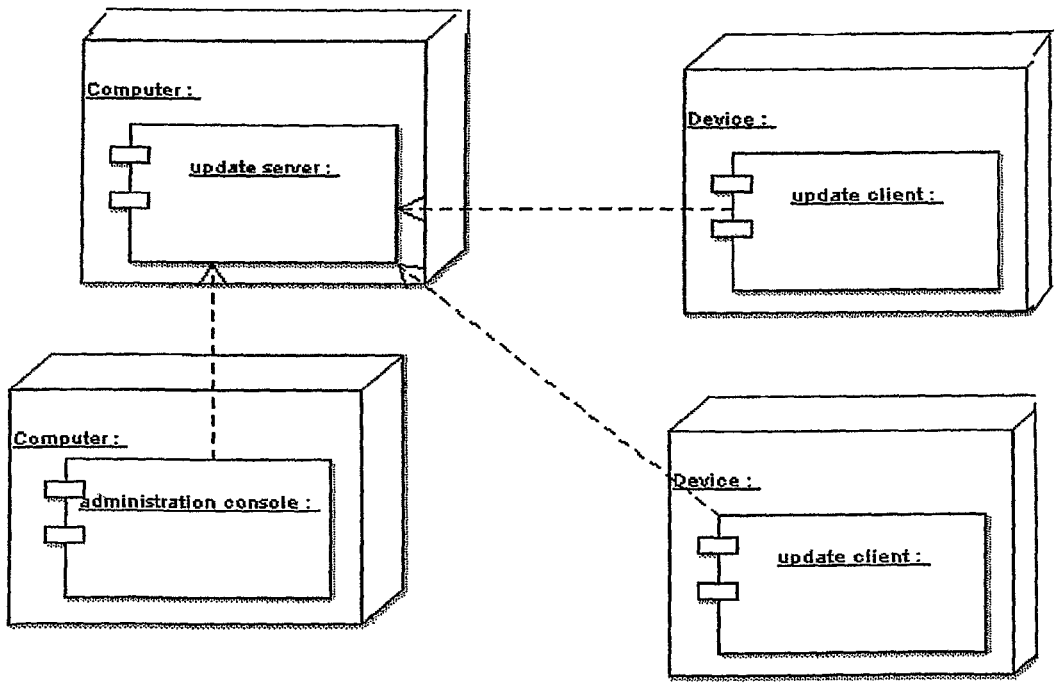

Fig. 4: devices and the data processing infrastructure (UML component diagram)
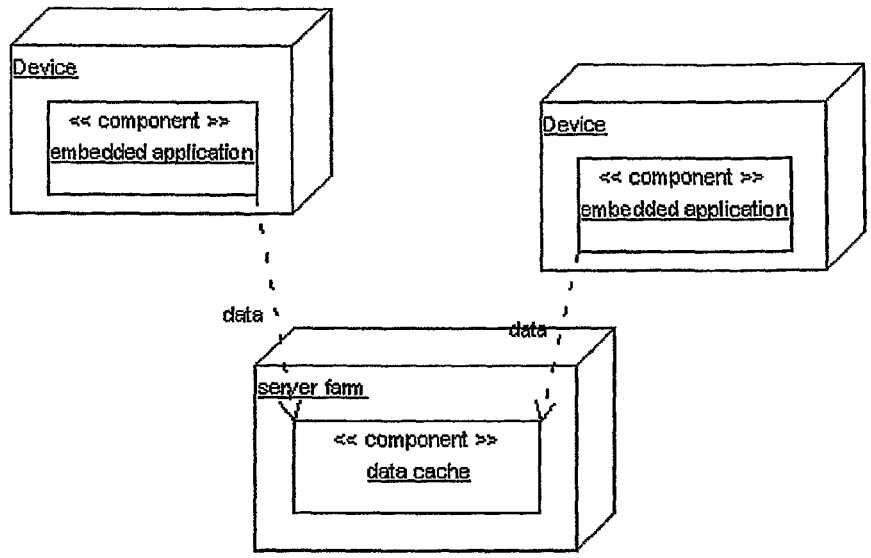
Fig. 5: information integration framework (UML component diagram)
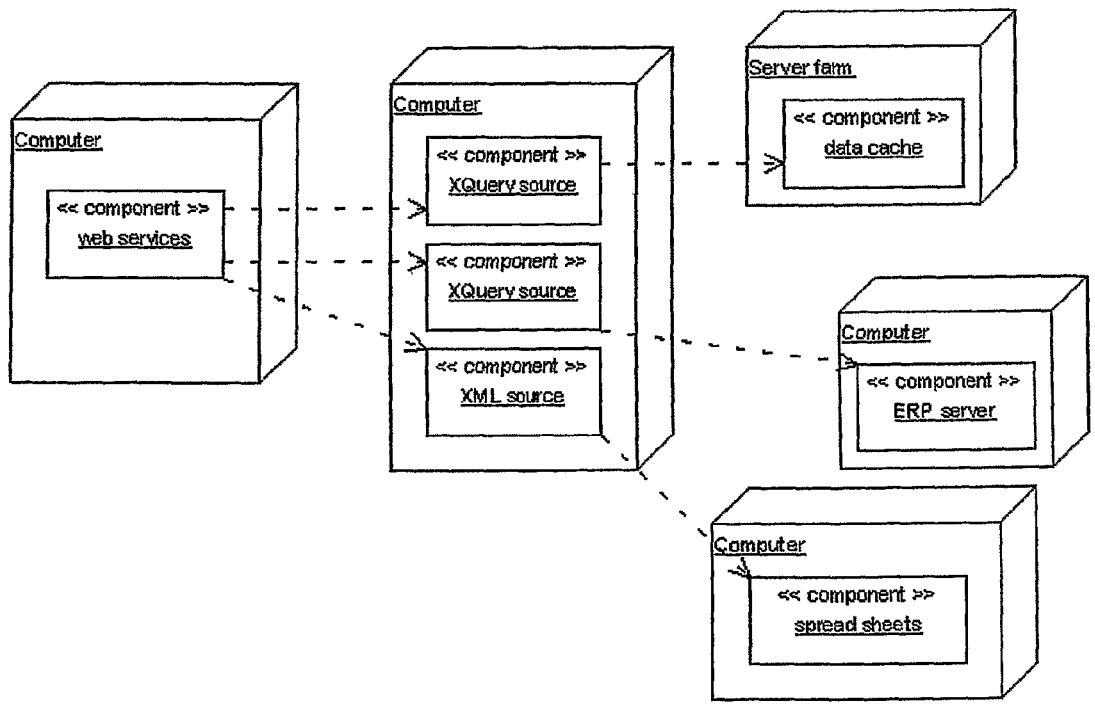

Fig. 6: A client application using a service published by an embedded application
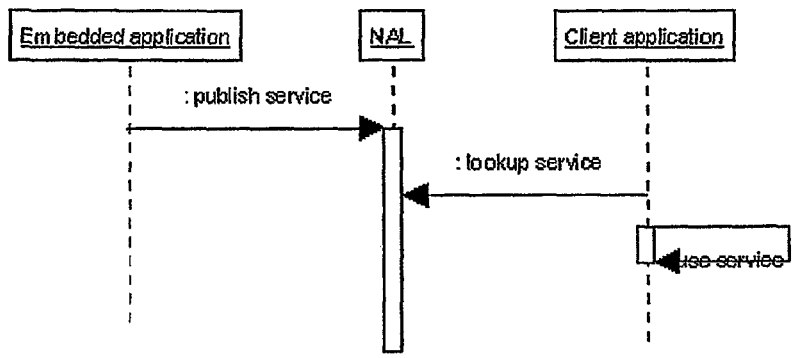
Fig. 7: Microkernel management (UML sequence diagram)
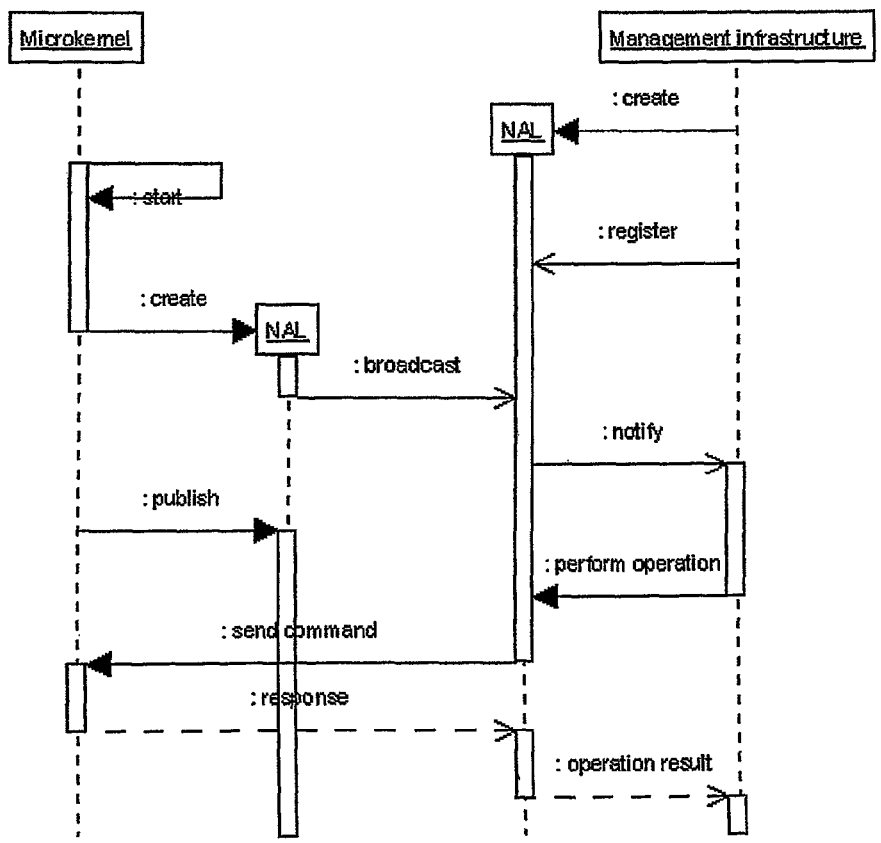

Fig. 8: Deployment sequence – polling scenario (UML sequence diagram)
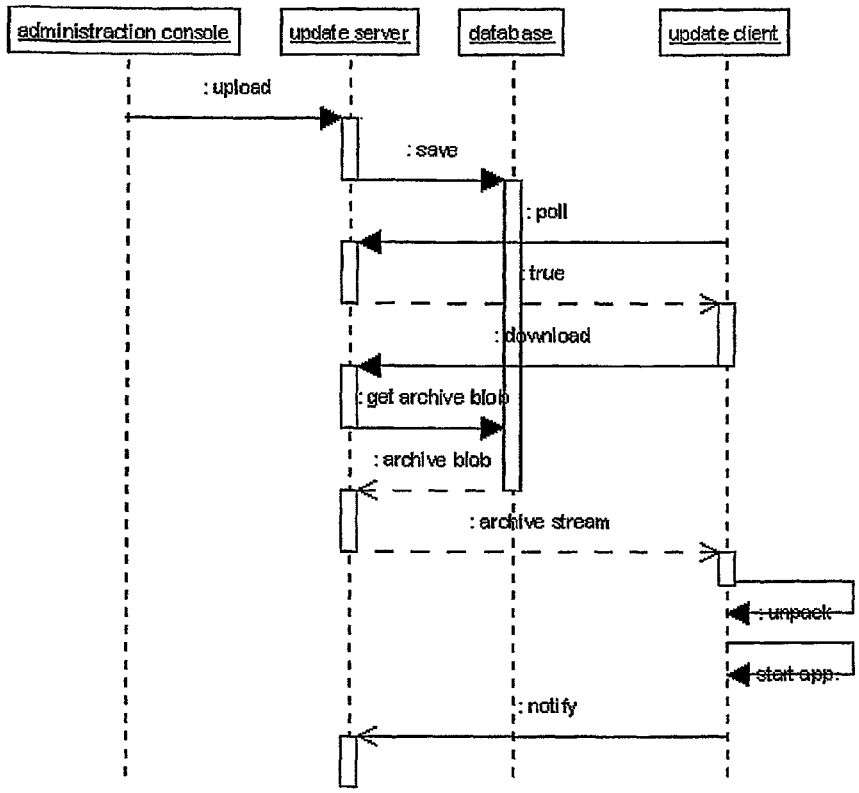
Fig. 9: Devices and data processing (UML sequence diagram)
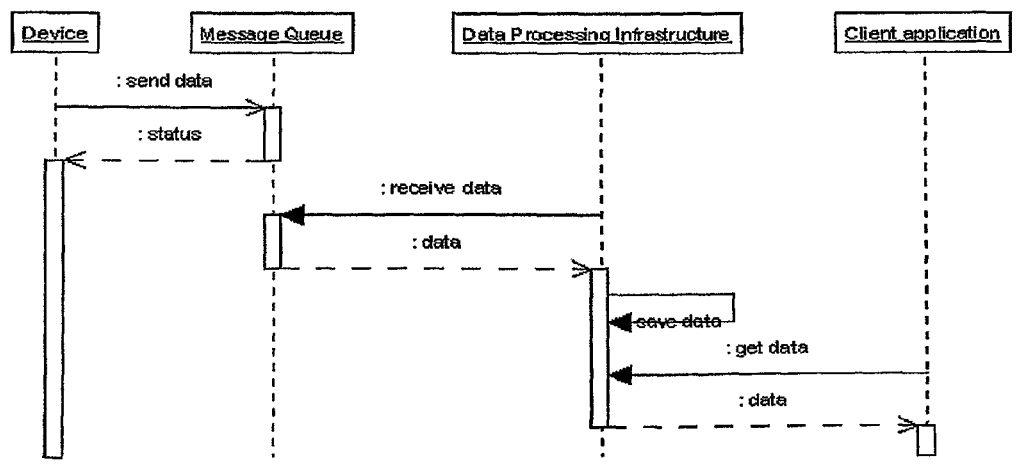

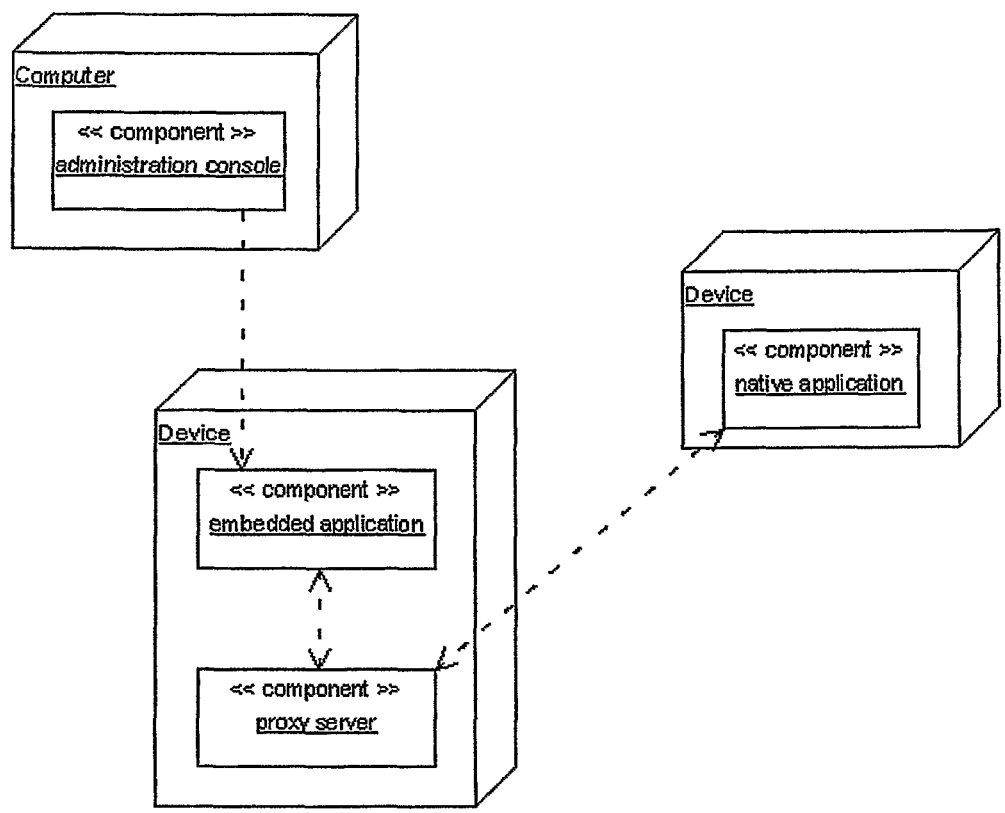
Fig. 10: The hub scenario (UML component diagram):

Fig. 11: A schematic overview of the enterprise asset management information integration framework of the present invention
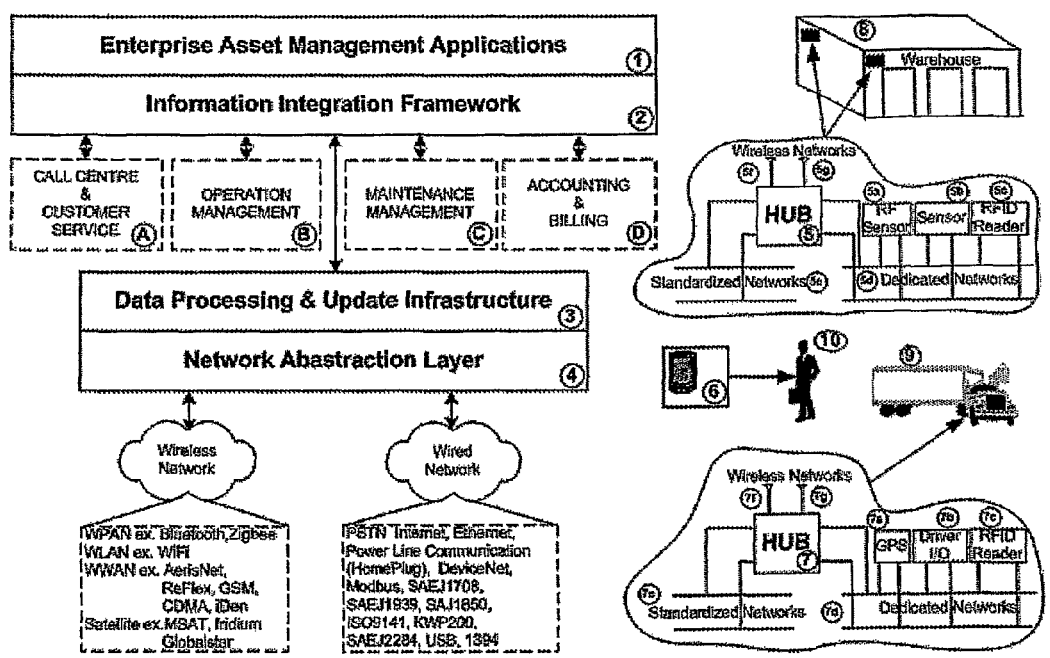

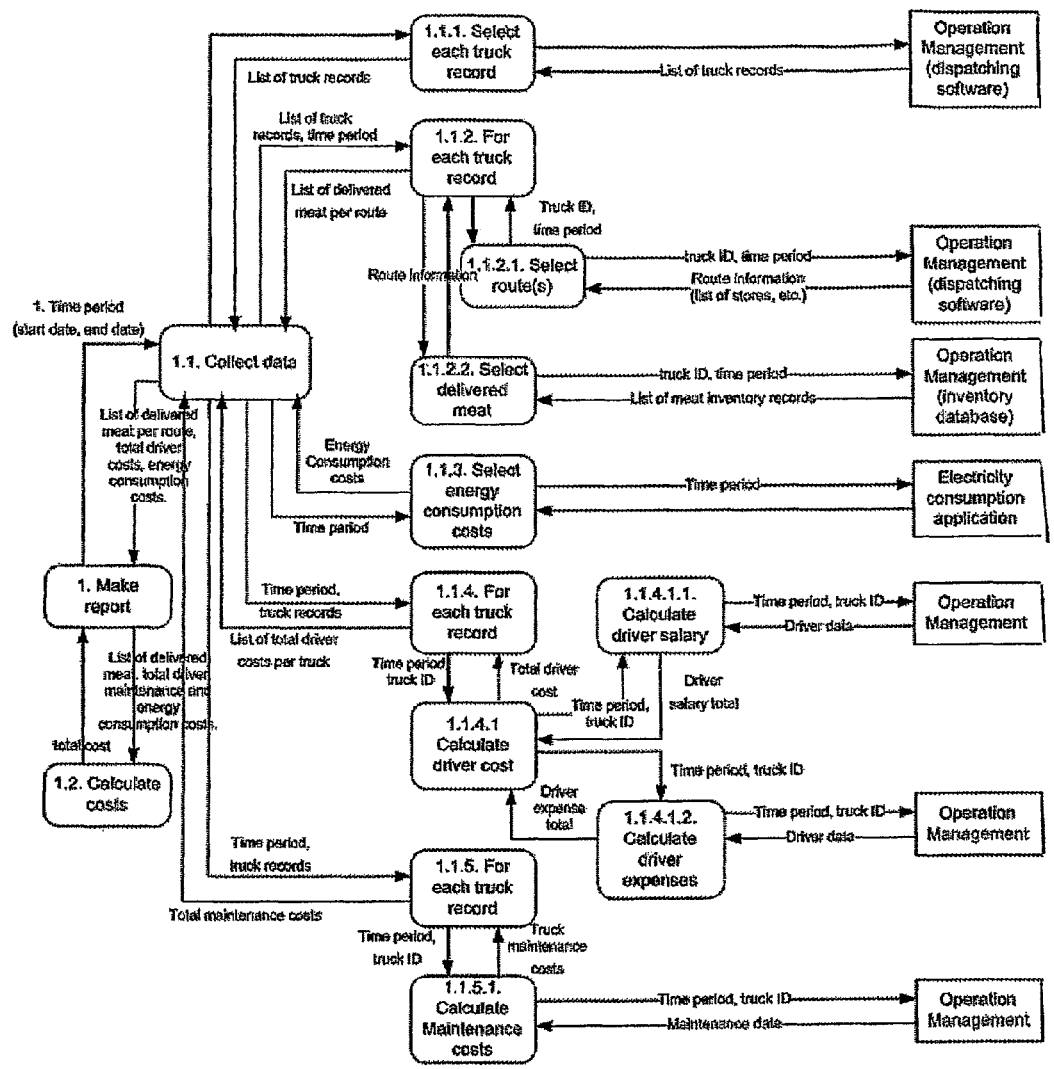
Fig. 12: is a data flow diagram of the enterprise asset management framework

DISTRIBUTED ASSET MANAGEMENT SYSTEM AND METHOD

FIELD OF THE INVENTION

The present invention is directed to a method and system for managing remote applications that process data.

BACKGROUND

Most modern organizations use machinery, buildings, computers, vehicles and various other types of equipment to fulfill their tasks on a day-to-day basis. Such assets consume resources, suffer degradation and incur maintenance and replacement costs.

Deficient asset management, especially in asset-intensive industries, such as discrete and process manufacturing, transportation, and utilities, leads to overspending, loss of productivity and waste. The main drivers to adopt an automated enterprise asset management solution are improving overall profitability, asset utilization, asset performance, equipment upkeep and uptime, budgeting/planning and increasing inventory turns.

Many organizations recognize untapped value inherent within their corporate assets but are unable to access and deliver this value because of reliance on manual, data-starved processes. Asset-heavy companies have facilities geographically dispersed, production equipment with various interfaces and protocols, vehicle fleet and IT infrastructure using legacy, paper-based processes for the up keeping, organizing and maintaining their critical assets.

Asset management decisions can be only as good as the data on which they are based. Inaccurate and untimely data regarding an asset condition, utilization, and location will lead to sub-optimal decision-making. Critical asset data points such as historical and budgeted maintenance costs, warranty and license compliance, and facility and fleet utilization are often unstructured and collected randomly. Indeed, most asset-heavy organizations are currently using a paper-based system to manage and track their assets.

In order to properly manage assets, their status has to be monitored through time. Asset management decisions should be made in light of precise measurements and benchmarks. In today's connected and information-centric world, asset usage can indeed be thoroughly measured: assets, whether mobile or stationary, host computing devices that provides precious data about their day-to-day utilization and performance. This data is the raw material of the asset management process.

Dispersed assets of various types should not imply a fragmented asset management strategy. On the contrary, diverse assets are often interdependent and need to be managed as a whole so that their bottom-line impact on an organization can be fully understood.

This holistic approach is impeded by the very nature of assets and the environment in which they are being used: most of the time various assets are networked through different protocols, are remote and not easily accessible. Oftentimes, they disconnect from the network and become unavailable for an undefined period of time, for example in the case of mobile assets. These mobile assets are also subject to physical constraints over which, very often, minimal control can be exerted.

In addition, the dissemination of assets has generally meant that data about these assets is also scattered, buried in isolated and independent data silos: databases of all types, spreadsheets, paper-based reports. The outcome is that most organizations have a partial, fragmented and incomplete view of the assets they own. Isolated asset management will result in sub-optimized and erroneous analysis and can severely limit an organization's ability to make sound decisions regarding asset maintenance, labor planning, parts procurement, inventory control, not to mention more strategic decisions, such as productivity improvements or asset reuse, refurbishment, and retirement.

A large portion of asset management consists of deriving structured and actionable information from unstructured asset data so that decision makers at every level of an organization, from the shop floor to the top floor, or from sensor-to-boardroom (S2B), can make decisions ranging in complexity from labor assignment to asset depreciation and reinvestment planning. These decision makers need access to this asset data in unique formats and at specific times. Relying on static spreadsheets and file cabinets brimming with paper files, asset managers cannot provide their organizations with this kind of data aggregation, normalization, and dissemination.

Thus, access to valuable actionable information can only be obtained by breaking barriers between data silos within the organization. This information integration process creates new, synthetic information on the basis of which asset management decisions are ultimately taken.

The information integration process is made difficult by numerous factors that the asset management process only accentuates: First, the large amount of information: recent studies indicate that business-relevant information is growing at around 50 percent compound annual growth rate with about one to two exabytes ($10^{18}$) of information being generated each year.

Second, the heterogeneity of data has resulted in the fact that records no longer sit in well-defined relational database tables (typically referred to as structured data). Increasingly, organizations have to deal with unstructured content such as text (in e-mails, Web pages, etc.), audio (call center logs), and video.

Third, the federation and distribution of data is no longer confined to sets of databases (such as in a data warehouse), but is distributed across multiple computers, potentially spanning different organizations. In addition, federation (who owns and controls the data and has access to it) is a new problem that distributed database technology has typically not addressed. In federation scenarios, one typically cannot assume full SQL (Structured Query Language) or other standard-based query languages.

Fourth, the data needs to be manipulated, aggregated, transformed, and analyzed in increasingly complex ways to produce business intelligence. A large fraction of the growth in relational databases in the early to mid-1990s was fueled by business intelligence in tasks ranging from decision support through complex SQL queries, to on-line analytical processing (OLAP), and all the way to data mining.

Fifth, the exponential increase in the amount of produced data and the disparity among data sources hinders the ability for decision makers to sift through information and act upon it. This suggests that some actions should be automated. Eventually, automated business rules can trigger business processes (which can also be automated, wholly or in part).

Conclusions drawn from the analysis of past asset management installments together with recent technological developments enable a paradigm shift that will result in comprehensive and optimal solutions that address the whole spectrum of problems pertaining to asset usage, from physical resources to strategic decisions and actions.

Indeed, with the advent of highly integrated computing power into low cost microprocessor and memory, wireless communication, constant improvements in computer architecture, the progress of miniaturization, and the development of high-level, dynamic and standard-based programming languages for constrained environments, embedded devices are becoming an integral part of the computing landscape. Indeed, for many years, devices have been limited to low-level sensing and relaying of data, performing little work onto the devices themselves. This has been the trademark of (Supervisory Control and Data Acquisition) SCADA applications. Furthermore, the very nature of the technology used to implement SCADA has induced tight coupling between the applications and the hardware on which they are deployed, for applications have been typically designed with statically compiled languages that have strong ties with low-level, device-specific functions. The combination of lower grade execution environments and strong coupling with hardware has resulted in SCADA applications being functionally minimalist, and difficult to maintain and quasi impossible to evolve.

In the future, devices will be able to process data and store it locally for undefined periods of time; high-level and dynamic programming languages will act as an abstraction layer between applications and hardware—making applications device-independent. Consequently, applications will grow in complexity; new functionalities will be added in the form of software updates—sparing the replacement of hardware, or direct access to said hardware. In such a context, the ability to centrally deploy and maintain multiple applications on multiple devices dispersed on a large scale will become a necessity.

The proliferation of devices will in great part be made possible by improvements in networking, best embodied by the advent of the internet and burgeoning wireless technology. Wireless networks have characteristics that will impact how distributed applications embedded within devices will be interconnected. Indeed, wireless networks are characterized by intermittent connectivity (this is especially true in the case of mobile assets, which can be in the surroundings of a wireless network at one moment, and disconnected at another) and by changing topology (devices in a wireless network can appear and disappear, especially in the case of mobile devices). The bandwidth of wireless networks can also vary greatly not only because of the number of peers on the network and network usage (which also affects wired networks), but also because of physical constraints (weather, geographical obstacles . . . ) over which no human control can be exerted. In addition, wireless networks often have limited range (from a couple to several hundred feet).

Various types of networks and networking conditions may impede application portability and behavior if no precautions are taken at design time. Furthermore, in many ways, improvements in network connectivity, both from hardware and software standpoints will have significant consequences on application design and distribution. Supervisory Control and Data Acquisition (SCADA) applications have been built around the client-server model: a centralized facility stores raw data acquired through communication links with devices. Processing of the said data is thus performed centrally. If the number of devices becomes large and the amount of data acquired from these devices also reaches a considerable level (which is often the case), the centralized facility quickly becomes overwhelmed. Adding more processing power to the centralized facility can create more problems, such additional costs and management issues. In addition, strong dependency on a centralized facility makes embedded applications highly vulnerable to networking failures: should the connection between devices and the centralized facility fail, precious data might eventually be lost.

Combined with improvements at devices themselves (processing power, storage capacity, high-level and OS-agnostic languages), new networking possibilities enable a shift from the client-server model (adopted by SCADA applications) to the peer-to-peer one. This shift yields highly distributed and pervasive architectures, with devices acting as semi-autonomous entities, connecting intermittently to potentially many networks in order to provide accumulated data (storing and processing it in the meantime), to offer software services to other devices and to act as relays between devices—for example in cases where range is limited. In addition, device autonomy is further improved through asynchronous communications, where receivers of messages are spared from having to respond immediately to senders. The asynchronous model decouples senders and receivers, allowing for better reliability in case of network failures (responses can be sent when the network becomes available), and scalability (a device can store a request locally, until it has sufficient resources to process it). Yet, sometimes, it is preferable and even necessary that synchronous communications be used (for example in the case of data streaming).

Furthermore, use of static addressing as commonly found in traditional SCADA systems forbids the creation of ad-hoc networks (where participants are not necessarily known in advance) and couples communicating parties with one another. Nowadays, distributed computing frameworks provide mechanisms to avoid static addressing; these mechanisms often rely on multicast, naming services or so-called "rendez-vous", and are often used jointly. The present invention allows network participants to appear in the network and communicate with other nodes dynamically, without having to know each other in advance.

The emergence of embedded applications and the proliferation of devices bring up possibilities, but also entail a new problem: that of remote management. Application management encompasses various tasks pertaining to the application life cycle: once an application has been implemented, it has to be deployed. After deployment, it should be monitored (to ensure proper operation). At times, some actions must be triggered through human intervention (in response to specific conditions)—this suggests that applications should provide a minimal administration interface. Eventually, a new version of deployed applications will be made available: older versions should thereafter be updated. On a personal desktop computer, the application updates appear trivial. But when such tasks have to be performed on multiple remote devices, they become impossible to realize without the proper infrastructure.

PRIOR ART

The present invention builds on the lessons learned from SCADA (Supervisory Control and Data Acquisition) systems. The origins of SCADA systems can be traced back to the 1960's. At the time, such systems would involve input/output transmissions between a master station and a remote station. The master station would receive data through a telemetry network and then store the data on mainframe computers. From a simple architecture at the beginning (involving only two "stations"), SCADA systems have evolved into a more distributed architecture, with multiple remote sites.

Typical SCADA systems now involve four major components: a Master Terminal Unit (MTU), the Remote Terminal Unit (RTU), telecommunication equipment, and SCADA software. The MTU provides a man-machine interface and acts as the central control point. The RTU, located at a remote site, gathers data from devices in the field, and awaits commands emanating from the MTU. The telecommunication equipment is used to enable communication links between RTUs and MTUs; in the SCADA world, uninterrupted, bi-directional network communications are necessary in order for the system as a whole to function properly. Finally, the SCADA software implements the overall application of the SCADA system.

The architecture of SCADA systems is highly centralized: RTUs have control over devices that perform very little work, other than monitoring the asset on which they are installed and emitting status data at predefined intervals. RTUs are themselves highly dependant on their MTU. The whole topology is sensitive to network failures: provided communication links are broken between devices and RTUs, or between RTUs and the MTU, the system is incapable of working as expected.

In recent years, SCADA systems have benefited from the advances made in networking. Communication links now generally follow standard-based, open protocols such as Transmission Control Protocol (TCP) and Internet Protocol (IP), and data representation formats Extensible Markup Language (XML). Wireless networking also makes supervisory control and data acquisition SCADA systems more pervasive. The second-generation SCADA integrates internet-related and wireless technologies. U.S. Pat. No. 6,768,994 (Web-based data-mining and location data reporting and system, Howard et al.) describes such a system—in the context of fleet management: remote assets connect to a wireless-enabled, central "Gateway" that features a database in which device data is stored. The Gateway presents the data to users through a "reporting system", presented as a web page. The reporting system creates reports on a per-asset basis. The system uses a variety of Internet and database technologies Active Server Pages (ASP), Extensible Markup Language (XML) and Extensible Stylesheet Language (XSL), Dynamic Hypertext Markup Language (DHTML . . . ) to manage interaction with users and the Gateway database. The patent does not address the information integration problem: users are provided with device data contained in the Gateway database, and no concise architecture is described that would address integrating the said data with information gather from heterogeneous data sources. In essence, the system is designed along the lines of first-generation SCADA systems: a highly centralized architecture in which remote assets act as mere emitters of raw data, and where the bulk of the processing work is performed by a central "Gateway".

Another patent, U.S. Pat. No. 6,757,714 (Reporting the state of an apparatus to a remote computer, Hansen), describes a SCADA system that uses two specific Internet technologies to ensure communication between a "device embedded in an apparatus" and a remote computer: SMTP (Simple Mail Transport Protocol), the protocol that is used on the Internet to send email messages, and XML (Extensible Markup Language), an open, generic data representation format that has been widely adopted throughout multiple industries for technology-agnostic message exchanges. In this patent SMTP is used as a message exchange protocol between assets (apparatuses) and the remote computer. Message content is encoded using XML.

The system described in the above-mentioned patent replaces direct communication links between assets and the remote computer (here, the MTU in SCADA terminology) with indirect links: since messages from assets to the remote computer are sent using SMTP. An SMTP mail server is used to receive and store the messages until they are picked up by interested parties—the same is applied for messages that go the other way around (from the remote computer to assets). This approach has the merit of decoupling senders of messages from receivers. Nevertheless, the system described by U.S. Pat. No. 6,757,714 does not formally mention or discuss the information integration problem and a solution thereof. In addition, in case of the mail server becoming unavailable, the patent does not describe a contingency plan, nor does it describe how the system as a whole reacts to such an event—one must assume that data, at this point, is simply lost. By the same token, the patent does not delve into how unclaimed email messages are dealt with. Finally, although the system features a certain level of decoupling, the architecture remains highly centralized as a whole: processing at the assets is restricted to the generation of status data (in the form of email messages).

Furthermore, the use of a mail server brings forth the issue of addressing and network abstraction: first, sending messages to given parties requires knowing there address in advance. Nowadays, robust distributed computing frameworks allow dynamic discovery of addresses based on criteria that are specified at runtime. Thus, in the context of such frameworks, communicating parties are not complied to know each other's address in advance. Second, the use of specific address types (in this case, email addresses), has the flaw of binding applications to specific communication means. This makes applications highly dependent on the flaw, limitations and incapacities of the chosen communication technology.

For its part, describing its solution, IBM has produced a document entitled: "Integrating monitoring and telemetry devices as part of enterprise information resources" (March 2002). The document is preoccupied with "end-to-end business integration" and describes "telemetry devices" as representing one end of the business integration spectrum. In a manner analogous to the one described in one of the above patents, the described solution relies on an asynchronous communication model supported by a publish/subscribe message queue. The message queue acts as a central broker between senders (publishers) and subscribers (receivers). Message queues, which are server software specialized in asynchronous message processing, are a better choice than mail servers to handle such a task: most message queues have provisions concerning unclaimed messages (which they generally treat with timeouts), and redundancy (to support additional load and as a protection against server crashes). In the context of the solution pushed forward by IBM, messages are encoded using IBM's proprietary MQIsdp protocol—rather than the now ubiquitous XML.

In all the cases explored above, several issues remain unaddressed: first, all solutions are silent with regards to the management of applications remotely distributed on multiple devices. This constitutes one of the major hurdles in the elaboration of large-scale SCADA solutions. Second, all solutions sport the computation model of first-generation SCADA systems, where data processing mostly occurs at centralized server farms (with devices confined to simply emitting status data). Third, the solutions that rely on asynchronous communications force the use of a mediating party (a mail server or a message queue), an approach that forbids direct, point-to-point links, and even asynchronous ones—which can prove too restrictive. Finally, all solutions only vaguely address the information integration problem in all its complexity (if not at all).

Four chief hurdles must be addressed as a whole in order to deliver an effective asset management solution: 1) isolated and dispersed assets of various types; 2) lack of precise, timely data about assets; 3) inadequate executive visibility and involvement in asset management; and 4) difficulty of scaling and maintaining asset management solutions as the number of monitored assets increases.

The prior art does not present such a holistic solution. There is therefore a need for an asset management system that overcomes current shortcomings: the present invention addresses the problem of being able to manage applications that are remotely distributed on multiple devices. This constitutes one of the major hurdles in the elaboration of large-scale SCADA solutions. Additionally, the present invention features robust and timely data acquisition from a vast array of assets, over various types of network. Furthermore, the present invention features real-time integration of data acquired from remote assets with other data coming from multiple heterogeneous data sources. This provides a strategical view of an organization's asset use.

SUMMARY OF THE INVENTION

The present invention provides a method and system for managing remote applications that process data within devices in order to integrate such data with heterogeneous enterprise information systems and business processes.

An embodiment of the present invention would encompass devices, embedded applications, telecommunication means, centralized data processing and information integration software to implement a comprehensive distributed data processing system.

The system allows for remotely deploying, running, monitoring and updating applications embedded within devices. The applications acquire, store and process data about assets. The processed data is eventually sent to a centralized data processing infrastructure. Embedded applications communicate with the centralized processing infrastructure by way of a network abstraction layer that shields them from network-specific details. The network abstraction layer is also used to communicate with embedded applications remotely. The network abstraction layer takes into account networking limitations and disparities by hiding networking details behind an abstraction that provides basic messaging primitives and supports lowest-common denominators. Applications will therefore be portable not only across devices, but also across networks.

The centralized data processing infrastructure receives device data through asynchronous messaging server software. The data is saved in a data cache where it awaits further processing that is specific to the domains in the context of which the invention is used.

In addition, the system comprises an information integration component that is used to integrate the data residing in the cache with data extracted from heterogeneous data sources, in real-time, in order to create aggregated synthesized information. Use of the integration component is domain-dependent and varies according to the application.

The present invention is also directed to a method for managing remote applications that process data in order to integrate such data with heterogeneous enterprise information systems and business processes. The method includes deploying, running, monitoring and updating embedded applications within devices. An abstraction layer is used to ensure communication between the applications in the system. An information integration framework is used to integrate data which is received from the embedded applications and combined with the information extracted from heterogeneous data sources, in order to provide an integrated view of an organization's asset and trigger automated business processes.

It is an object of this invention to allow the management of dispersed and remote assets on a large scale.

It is another object of the present invention to improve the reliability of asset management solutions in order to provide precise and timely data about asset usage.

It is a further object of the present invention to break barriers between isolated data silos through information integration, wherein the data obtained from the assets is aggregated with the data gathered from multiple heterogeneous sources, within and outside an organization.

It is another object of the present invention to favor decision-making pertaining to asset usage, by first presenting to managers a comprehensive view that links asset-related measurements to financial, accounting and other operational data.

Yet another object of this invention is to allow the publication of ad-hoc software services that are accessible remotely, in a peer-to-peer fashion.

This invention, as compared to conventional systems, presents numerous advantages. First allows applications on devices to be dynamically and remotely monitored, administered, and updated without human intervention at devices themselves, and without terminating operating system processes. The net result is that devices do not need to be physically accessed, a necessary prerequisite when devices are remote and/or numerous.

Another advantage of this invention is that it enforces network independence through a common networking abstraction that respects lowest-common denominators in terms of network capabilities and types. This makes applications portable amongst different networks.

An additional advantage of this invention is that it encourages peer-to-peer topologies (rather than use the more common client-server model), enabling direct network links between nodes. Devices can send and receive requests, both to/from central servers (or MTU, or "remote computers") and to/from other devices.

A still further advantage of this invention is that it makes applications highly independent from the hardware on which they are deployed through the use of a high-level programming language and multi-platform execution environment. This makes given applications deployable on multiple types of devices.

In addition, this invention maximizes the use of processing power and storage capacity offered by devices. Combined with the benefits of peer-to-peer, this approach increases scalability and resilience to network failures: overall workload is shared among devices and central servers (or MTU, or "remote computers"), devices can mutually provide services to each other, and they also can act autonomously when no network connectivity is currently available.

Still another advantage of this invention is that it formally supports the integration of device-generated data with heterogeneous information systems, resulting in synthesized information that feeds strategic decisions and triggers business processes.

BRIEF DESCRIPTION OF THE FIGURES

FIG. 1 is a schematic demonstrating the relationship from the microkernel to the device;

FIG. 2 is a schematic showing the relationship from embedded applications and devices;

FIG. 3 is a schematic overview of the asset management infrastructure;

FIG. 4 is a schematic overview of the devices and data processing infrastructure of the present invention;

FIG. 5 is a schematic overview of the information integration framework of the present invention;

FIG. 6 is a schematic overview of a client application using the system and method of the present invention;

FIG. 7 is a schematic overview of the microkernel management system;

FIG. 8 is a schematic overview of the deployment sequence of the present invention;

FIG. 9 is a schematic overview of the device and data processing system of the present invention;

FIG. 10 is a schematic overview of the hub of the present invention;

FIG. 11 is a schematic overview of the embodiment of the present invention in the context of a specific distribution supply chain;

FIG. 12 is a data flow diagram of an embodiment of the present invention in the context of a specific distribution supply chain.

DETAILED DESCRIPTION

The following detailed description, given by way of example and not intended to limit the present invention solely thereto, is best understood in conjunction with the accompanying drawings of which:

System of the Present Invention

A system based on the present invention first consists of devices that are installed on (or communicate with) assets of various types. These devices host embedded applications that acquire, store and process data about the assets, and transmit said data to a centralized processing infrastructure. The centralized processing infrastructure caches the data so that it can be integrated in real-time with data from various heterogeneous information systems. The integrated information is also used to trigger automated actions and business processes.

More precisely, a system based on the present invention first consists of embedded applications remotely deployed within devices that are themselves hosted within, or communicate with, various assets. In the context of the present invention, devices are autonomous apparatuses featuring computing power, storage capacity and networking capability. Applications are for their part domain-specific computer programs that are executed within a Virtual Machine (VM). A VM is meant to abstract applications from hardware (mainly the CPU, Memory, Input and Output) and operating system-specific details by translating the programming instructions to native code, which consist of commands that are then directly executed by the CPU—thus making applications hardware and operating system-independent). Each device has an operating system and a VM: an instance of a VM is executed within an operating system process. The VM instance starts and terminates at process startup and shutdown, respectively.

The present architecture provides a microkernel, which is a basic software agent that manages the lifecycle of one to many embedded applications, and within which the said applications are hot-deployed. One microkernel is physically installed on each device prior to the device being deployed. A microkernel is started within a VM process (or instance) at device boot time, and terminates at device shutdown (see FIG. 1 and FIG. 2).

Remote application updates are made possible by the advent of dynamic, high-level and multi-platform languages that do not require static compilation. From a remote management point of view, such languages allow for dynamically updating applications without actually terminating software processes, a feature often dubbed "hot deployment". This greatly differs from the traditional approach, where statically compiled languages are used and forbid hot-deployment. In such environments, if applications need to be updated, human intervention at the device itself becomes necessary. This of course becomes unmanageable with applications remotely deployed on a large scale.

A microkernel remains agnostic with regards to the domain of applications. A microkernel and its embedded applications are bound by a predefined contract: applications provide a lifecycle interface with which the microkernel interacts. The lifecycle pertains to application deployment and undeployment as well as startup and shutdown. Similarly, the microkernel has an interface that is made available to embedded applications in the course of their execution. This interface allows applications to be notified upon certain events occurring within the microkernel (for example, the deployment of other applications therein), and to act upon these events (a given embedded application might need the services of another embedded application). In addition, some applications might be designed as an extension mechanism of the microkernel, wherein applications need to have access to low-level microkernel functionality Embedded applications, as well as other types of specific applications in the context of the present invention, make their capabilities available to other entities through functional interfaces called "services". Many implementations may exist for a given service. Client software (that uses services) only deals with the service interfaces—and is thus unaware of service implementation details. Client software can also implement a service, and thus also be used by other client software. The present invention allows services to be published on the network: such services thus become accessible remotely.

Furthermore, a system of the present invention consists of a management infrastructure that is used to control microkernels and applications within remote devices. The remote management is made available to users and applications that have required access rights in the form of a user and a programming interface, respectively. The microkernel provides a management interface that is accessible through the remote management infrastructure and allows deploying and undeploying embedded applications as well as monitoring a microkernel instance while it is running. In addition, applications themselves can present a domain-specific management interface. The remote management infrastructure allows performing distributed management operations on multiple microkernels or applications at once.

As part of the management infrastructure, an application update module is provided that allows publishing new embedded applications or new versions of existing embedded applications. This update module allows remotely controlling the deployment and update of embedded applications and is a key element in order to enable large-scale deployments. The application update module first comprises a server part (the update server), that in fact consists of a web application presented as a set of web pages, and a set of programming instructions that interacts with a database used to store new applications and application updates, which themselves consist of archive files holding all resources (files and executable code) necessary to create embedded application instances. Second, the update module comprises a client part (the update client) that is embodied by an embedded application that is deployed within microkernels when the latter are installed on devices. The update client is intended to intermittently poll the update server in order to detect new applications or application updates. It is also in charge of downloading the archive files corresponding to the new applications or updates under the microkernel. Once the download has finished, the microkernel is notified, and the effective hot-deployment of the new application or update is performed (see FIG. 3).

Furthermore, a system of the present invention encompasses a data processing infrastructure. The data processing infrastructure first consists of a data cache, which encompasses a database or set of databases together with distributed applications that store and flush device-generated data into/from the databases according to predefined strategies. The processing infrastructure also makes use of an information integration framework that allows integrating data from the data cache with that from multiple heterogeneous information systems (see FIG. 4).

The information integration framework relies on XML and XQuery. In the context of this framework, heterogeneous data sources, as well as the data cache, are represented as sources of XML documents and/or XQuery-enabled data sources. Such sources are respectively named XML sources and XQuery sources. An embodiment of an XML source can directly abstract a native data source, or it can be a virtual composition of other XML, XQuery and native data sources. Such an approach also applies for embodiments of XQuery sources, which for their part support querying underlying data sources using the W3C's XQuery language. The information integration framework can be used by specific software containing program instructions that fulfill domain-specific tasks and interact with XML and XQuery sources to extract needed data. Such software applications are mainly intended to present synthesized information to end users in the form of scorecards, dashboards and reports. In addition, the framework is meant to allow developing web services whose execution can be coordinated as part of complex, automated or partly automated business processes (see FIG. 5).

From an interoperability point of view, the components of the system are linked together through a communication infrastructure that hides networking details behind a single, common, both synchronous and asynchronous networking abstraction. This network abstraction layer (or NAL), is directly dealt with by all components of the system that need to communicate with other components. The NAL also supports the publishing, discovery, and lookup of application services: publishing consists of broadcasting a given service instance's presence on the network (this is typically done at service startup); discovery is the action of listening for new service broadcasts; and lookup consists of requesting for a given service. Publishing, discovery and lookup are used to eventually enable synchronous communication between client applications and service instances: once a client application has successfully looked up a service, it can use that service's functionality (see FIG. 6).

Specific embodiments of the NAL must support asynchronous communication. Such an embodiment can be in the form of server software that receives messages, dispatching each message to the interested party, or storing the messages until interested parties pick up the messages of interest. Another embodiment could be in the form of a direct, asynchronous communication link between two parties, without the mediation of server software. A message consists of meta-information and raw content. The meta-information holds, among other things, the identifier of the party to which the message is destined. The raw content is the data that the receiving party expects, per se. The asynchronous communication provided by a NAL implementation is in charge of routing the messages to the proper destinations, whether that communication is mediated by a specialized message queue or not (in the case of peer-to-peer).

The NAL does not impose restrictions with respect to the type of underlying network protocols that potential embodiments may require. Furthermore, embodiments of the NAL should support service publishing, discovery and lookup, as well as synchronous communications (between client applications and service instances).

A specific implementation of the NAL is acquired at runtime by passing implementation-specific initialization parameters to a NAL "factory". The factory creates a NAL implementation according to the specified parameters. Thus, client applications are not statically bound (at compile time) to given NAL implementations: which implementation is used is determined at runtime, according to specified parameters, generally provided as part of the client configuration.

Using the NAL, applications of any type can connect arbitrarily to any node in the network. More precisely, the NAL is not strictly meant to be used for communications between data processing infrastructure and embedded applications, or among embedded applications. For example, a given domain-specific client application could connect to embedded applications in order to directly have access to their functionality. One such common use consists of reading the data that embedded applications store locally in a database.

Method of the Present Invention

According to the present invention, embodiments generally consist of devices that are installed on assets deployed in the field. A microkernel is installed on each device and is intended to host embedded applications that collect, process and store data about the corresponding assets. On the other end, within some facility, messaging server software is set up in order to receive the data emitted by embedded applications. The data is received by means of a telecommunication link that is abstracted by the NAL and saved in a database. Within the facility, a computer is set up with an information integration application that extracts asset data from the database and integrates it with other data from heterogeneous information systems in order to produce aggregated information. How the aggregated information is presented and how it is used is application-specific; the information can be made available to web browsers and to other applications in the form of web services. Other such applications could execute business processes automatically, based on the information made available to them.

In a more concrete manner, an embodiment of the present invention consists of first installing devices on given assets in the field. Prior to installing devices, a virtual machine is installed on each of them, as well as a microkernel. The microkernel software is configured so that an instance of it is automatically started at device boot time. In addition, microkernels by default becomes fixed to the update client application. Each microkernel is given an identifier in the form of a sequence of characters. The identifier must be unique within the scope of a predefined logical device domain, identified by a name. A device domain is a set of devices that have been grouped for ease of management. Thus, the identifier not only identifies the microkernel per se, but also the device on which it resides, within a given logical domain.

A microkernel is strictly meant to act has a container for applications. These applications are not statically bound to the microkernel, but are rather deployed to it at runtime. Deploying applications into the microkernel consist of uploading these applications to it, by means of the network. Network connectivity is therefore required for such deployments to be remotely executed. Once an application deployment reaches a microkernel, the corresponding application is started in-process by that microkernel.

The microkernel is configured with a configuration file. The file's content is processed at microkernel startup. The configuration parameters consist of: the microkernel's assigned unique identifier and domain name, in addition to network-related parameters that are passed to the NAL factory. The factory is used by the microkernel to acquire network connectivity, in the form of a specific NAL implementation. The microkernel uses the NAL to publish its presence to the network. In addition, the microkernel subscribes to the NAL in order to receive broadcasts from other nodes in the network. Thus, all microkernels are mutually made aware of the presence of other microkernels in the domain (see FIG. 7).

Such broadcasts are equally used by the management infrastructure to detect appearing microkernels (thus, devices), also using a NAL implementation. The management infrastructure organizes devices on a per-domain basis. Once microkernels have connected to the network, they (as well as the applications they embed) can be remotely administered through the user interface provided as part of the management infrastructure.

The administration user interface (or administration console) has a section devoted to remote deployment. This section of the console allows interacting with the update client applications within each microkernel. Thus, through that section of the console, administrators can remotely deploy new applications within all or given microkernel instances.

In order to deploy new applications or application updates, the corresponding archive files must be uploaded within the update server that is part of the management infrastructure. This is also done through the administration console. An application archive is assigned an application name and a version number. This information is contained within a "well-known" file that is also part of the archive file. Within the update server, archive files are organized by logical name, and ordered by version number under each logical application name. Once an application archive has been uploaded within the update server, the administrator to existing microkernels associates it.

The rest of the deployment procedure consists of the "deployment protocol" as shown in FIG. 8. After creation and confirmation of application archive and microkernel mapping, the update server notifies all update clients corresponding to the targeted microkernels that a new application, or new version of an existing application, is ready for download (see FIG. 8).

It is possible that some update clients be absent from the network when such a notification occurs. As a workaround, update clients are required to enquire about available application downloads when connecting to the network. Update clients can also be configured with an interval at which they will check for new downloads.

Upon being notified or detecting that a new application download has been made available, an update client is responsible for downloading the actual archive from the update server. As part of the deployment protocol, the update client is given a unique deployment identifier that is used later on to notify the update server about the success or failure of the deployment procedure. As the update client receives the deployment archive, it copies it under a predefined directory under the microkernel. Once the download has completed, the update client interacts with the microkernel within which it is embedded to complete the deployment procedure. The rest of the procedure first consists of the update client application notifying the microkernel about the new download. The microkernel then validates the content of the downloaded archive, and determines (by comparing version numbers and application names) if it consists of a new application, of a new version of a deployed application, or if it corresponds to an anterior or current version of a deployed application. In the first case, the new application is simply deployed within the microkernel; in the second case, the existing application is terminated, and the new version is deployed in its place; in the third case, deployment is aborted and an error is generated. Once this part of the procedure has completed, control returns to the update client; if for some reason the deployment could not occur, the corresponding error is returned to the update client. As the last step in the deployment protocol, the update client will notify the update server that the deployment has failed or succeeded (by providing to the server the microkernel identifier and domain name, as well as the deployment identifier and information about the error that has been produced, if any).

Embedded applications are generally intended to gather data about the asset on which they are installed. Such data is then relayed to a central data processing infrastructure. In the context of the present invention, embedded applications benefit from the resources of the device on which they are installed, such as processing power, memory, and storage capacity. Embedded applications maximize the use of these resources in order to ease the burden of the data processing infrastructure: rather than constantly emitting raw data by means of the network, embedded applications process the said data locally, and use their storage capacity to save the data resulting from the processing step, until it can be transmitted to the data processing infrastructure. Thus, embedded applications developed in the context of the present invention can operate autonomously (disconnected from the network) for long periods. In addition, an embedded application can implement specific services that it can publish on the network, through the NAL. It also can use other such services in the context of its execution.

Once embedded applications are ready to transmit their accumulated, pre-processed data, they connect to the NAL and asynchronously send the data to the data processing infrastructure. The message that is sent holds the data to transmit, as well as the identifier and the domain name corresponding to the device from which the data originates. The format according to which the data is sent is application-specific—the present invention makes no assumptions with regards to data format. In addition, in the context of large amounts of data, the transmission strategy is also left to applications (see FIG. 9).

When sending data to the processing infrastructure, communication is mediated by an asynchronous messaging intermediary (such as a message queue). Because of such an intermediary coupling between embedded applications and the data processing infrastructure is avoided: embedded applications send their data with no assumptions concerning the party (or parties) that will receive such data. Furthermore, the fact that such data is application-specific mandates that the data processing infrastructure be used by data processing applications that represent the other end of the spectrum (versus embedded applications). In traditional SCADA architectures, data processing software typically receives the raw data sent by embedded applications and inserts it in a database where it awaits further processing. That processing usually occurs asynchronously and results in other data that is also inserted in a database, where it is made available to applications within the organization.

In the context of the present invention, data processing applications have their workload greatly reduced by the fact that the received data has been pre-processed. This eliminates a whole step in the data processing flow, reducing complexity, resource consumption (processing power, storage space, bandwidth) and, eventually, costs and maintenance.

In some cases, some devices (such as the ones very often encountered in the case of telesensing) might not allow installation of a virtual machine and all the infrastructure (microkernel, embedded applications) described as part of the present invention. In such cases, a "hub" acts as an intermediary between such "micro-devices" and the other components of the architecture (as elaborated as part of the present invention). Implementing a hub consists of first setting up a device on which a VM and microkernel is installed, that will embody the hub. The microkernel embeds an application that communicates with a proxy server that is also installed on the hub device. The proxy server in turn communicates with a specific set of micro-devices, in the native protocol that the said micro-devices use, acting as a bridge between these devices and the hub's embedded application. This setup is reminiscent of RTUs in traditional SCADA systems: the hub allows remote communications with devices that have limited capacity and cannot support a software infrastructure such as described by the present invention (see FIG. 10).

Once data produced by devices has been processed and stored in databases, it can be accessed by information integration applications (that use the information integration framework). Such applications are domain-specific, and will typically cross-reference and aggregate the data resulting from the processing step with other data coming from heterogeneous sources, either inside or outside the organization. The information integration framework allows for virtually creating a database (that is: various data sources do not need to have their data physically imported within some central repository, such as in a data warehouse).

Such a virtual integration first involves encapsulating all data sources such that they appear as sources of XML documents. The types of documents that each of the source creates must be specified (through XML Schemas, DTDs, RDF definitions, or various other XML-related modeling format). In addition, the specific requests that each source supports must also be documented. Oftentimes, acquiring documents that respect certain predefined criteria is necessary: the information integration framework supports the use of XQuery in order to select specific documents.

More precisely, making given data sources appear as sources of XML documents in fact requires transforming output of given data sources into XML documents. Each virtual XML source can furthermore be itself integrated as part of another virtual source: XML lends itself well to aggregation techniques, were given XML documents are merged to form new documents. Thus, a given XML source can merely be implemented on top of other XML sources to create virtual, aggregated XML content.

The present invention also supports querying data sources in a standard-based and common format using XQuery. XQuery is a query language, as its name implies. It has been designed to allow querying XML repositories and documents using a specific XML markup. The output an "xquery" is itself an XML document that can be queried again, or integrated as part of a virtual XML source. Currently, implementations of the XQuery language exist that allow querying various types of repositories, including relational databases.

In the context of the information integration framework, XML and XQuery are thus used to integrated heterogeneous repositories by creating an XML-oriented virtual database that is queried using XQuery and that produces XML documents. The virtual database is queried by specifying the name of the query to execute, and the criteria to pass to the query. The result is a set of XML documents that match the given query, and whose data is gathered in real-time from the underlying integrated data sources.

Information integration applications use the information integration framework to provide specific functionalities to end-users and other applications. For example, an embodiment of an information integration application could access XML and XQuery sources whose resulting XML documents could be transformed into HTML using XSL, for display in web browsers.

One of the goals of the present invention is to allow developing web services that access integrated information and process it according to application-specific instructions. Such web services are meant for orchestration through high-level web service-oriented process definition languages such as BPEL (Business Process Execution Language). Applications that orchestrate web services fall into the realm of business process management (BPM), where web services are dealt with as steps in a business process.

The web service implementations use the information integration framework to provide a functional front-end on top of XML and XQuery sources. This front-end consists of various web service calls grouped according to their purpose or domain. Each call takes a series of parameters as input, and passes these parameters (and any additional ones) to the underlying XML/XQuery layer. The XML/XQuery layer returns the set of XML documents corresponding to the given parameters to the web service implementation. The implementation relays the set of documents back to the caller, in the expected format.

Such isolated, decoupled web services are then integrated at will to build specific applications. The present invention makes use of BPEL as a way to call various web services as part of given business processes. Orchestration of web services using BPEL takes the form of programming instructions that respect the BPEL notation. Such programming instructions, kept in files, are then executed by a BPEL engine (to which the BPEL instruction files are provided).

EXAMPLE OF EMBODIMENT

Context

The system and method described by the present invention can, for example, be used to implement a solution for determining the costs of transported goods in distribution supply chains. Such a solution combines data about vehicles, about goods that are often kept in warehouses for a given time period prior to being delivered, and about all the activities surrounding the delivered goods. The solution's purpose is to help determine the cost of transported goods, but can also help derive various other data about vehicle usage, driver productivity, etc.

The solution is inspired by fleet management solutions that are notably used in the context of pick-up and delivery, by private or public vehicle fleets, in order to carry given goods from a warehouse to specific destinations. Such solutions mainly rely on a dispatching infrastructure, composed of software, individuals and business processes. The dispatching infrastructure's duty is to assign delivery itineraries (or so called "routes") to available vehicles.

Generally, fleet management solutions operate in isolation from other information systems: they concentrate on vehicle usage and driver activity. By further integrating these solutions with other systems within the organization, interesting information can be obtained, that can prove strategically important.

The present example illustrates the benefits of a system based on the present invention. The example consists of a chain of grocery stores that owns a central warehouse where goods are kept until they are delivered to the different stores in the chain. The company wishes to optimize its meat supply chain by determining the exact costs, from the refrigerator in the warehouse until the meat reaches the stores.

Processes

The warehouse (FIG. 11, item 8) receives meat shipments on a daily basis. Every piece of meat that enters the refrigerator within the warehouse has been tagged with Radiofrequency Identification (RFID) tags. Incoming pieces of meat have their information (code, type, wholesale price, weight, etc.) registered in the meat inventory database kept within the warehouse. Every time a piece of meat leaves the refrigerator, its RFID is read by an RFID reader (FIG. 11, item 5c).

The warehouse is equipped with a wireless local area network (WLAN) that provides network connectivity to the various applications in its surroundings. A hub setup (such as described by the present invention—FIG. 11, item 5) is installed on a computer in the vicinity of the refrigerator in order to gather miscellaneous data about its use. For example, the data captured by the RFID reader within the refrigerator is tracked by an embedded application (within the hub) that adjusts its embedded meat inventory database accordingly (when a piece of meat enters the refrigerator, a record is created in the database that holds the identifier of the piece of meat. The "entered" flag is set on the record). Furthermore, the refrigerator consumes certain amounts of electricity that incur important costs. A sensor (FIG. 11, item 5b) is hooked to the refrigerator's power supply in order to measure electricity consumption. The sensor is remotely accessed by an embedded application that is installed as part of the hub. The application stores electricity consumption data (time, amount, quantity) in an embedded database, on the hub.

The quantity and types of meat that are to be delivered on a daily basis from the warehouse to each store is assigned by dispatching software that is part of the Operation Management unit (FIG. 11, item B). The software is fed automatically by electronic orders coming from the stores themselves. Stores can also place orders through the Call Centre and Customer Service unit (FIG. 11, item A). An individual known as the dispatcher is notified by the software of orders coming in. The dispatcher validates each order and confirms to what route it is assigned. A route is the combination of truck, a driver, and a list of destinations, for a given time period. The order is then sent to the warehouse where a manager picks it up. The manager is responsible for carrying out the orders: the appropriate quantities and types of meat are taken from the refrigerator and loaded into the truck that has been chosen and validated by the dispatching software and the dispatcher. When a piece of meat leaves the refrigerator, its RFID is detected and the embedded meat inventory application adjusts its inventory accordingly (by setting the "exited" flag on the record corresponding to the given piece of meat). Periodically, the application synchronizes its state with the centralized inventory application that is part of the Operation Management unit. The synchronization consists of detecting the pieces of meat that have both their "entered" and "exited" state flagged in the embedded database, as well as any error condition (the "exited" state cannot exist without the "entered" state; a given piece of meat cannot have only its "entered" state flagged on after a given amount of time— indicating that the meat has passed a certain expiration date). Error conditions are reported as part of the synchronization procedure. Pieces of meat that have entered and exited the warehouse have their corresponding records flagged accordingly in the centralized inventory database.

Each truck (FIG. 11, item 9) is equipped with an on-board computer on which a microkernel has been installed in the context of a hub setup (as described by the present invention—FIG. 11, item 7). The microkernel is provided with an identifier that also serves as the truck's identifier. In addition, each truck also has an RFID reader (FIG. 11, item 7c) that detects the RFID of every good that enters and leaves it. When such events occur, the embedded inventory synchronization application (deployed within the microkernel) is notified and stores the data corresponding to these events in a local database. In a manner analogous to the way the inventory synchronization application within the warehouse works, items that enter and leave the truck have a corresponding record that is created and updated within the database. The record corresponding to an item is flagged with the "entered" and "exited" states, depending on the context.

Another application is deployed that monitors the general status of the vehicle. This status consists of speed, RPM, transmission state, and other mechanical parameters that are captured by the driver input/output system (FIG. 11, item 7b). The application communicates with the driver I/O system to acquire the data; it does not keep every atomic data, but rather calculates, at a predefined interval and for every monitored parameter, differentials that are used to determine changes in status. Each status change is kept in a local database managed by the application. All data kept by the applications within the vehicle is timely as well as geographically referenced: the applications communicate with another embedded application that is itself linked with the vehicle's Global Positioning System (GPS) (FIG. 11, item 7a). Its sole purpose is to provide the current position of the vehicle.

A given truck might deliver meat to more than one destination. At each destination, the corresponding freight is unloaded. Every unloaded item triggers an RFID notification (as described above). The data about the event (time, RFID and location) is kept within the embedded database that is managed by the inventory synchronization application. Upon completion of a delivery, the driver (FIG. 11, item 10) proceeds to billing: an individual at the store signs an electronic bill through an electronic pad that is linked with the driver's handheld computer. The handheld computer is itself linked with the Accounting and Billing unit (FIG. 11, item D) through a wireless link. The billing application within the handheld computer makes use of the network abstraction layer (NAL) to send its data. If no network connectivity is available at that moment, the confirmation is stored in a database on the handheld computer, until it can finally be transferred. In the same manner, the billing application also sends a message to Operation Management that a delivery has completed. Both messages (billing and delivery confirmations) hold the identifier of the truck to which they correspond.

In the course of a route, a truck is the subject of various events: first, the truck leaves the warehouse. This signals the beginning of a route; this event is recorded by the driver, using his handheld computer. Operation Management is notified that the driver has started his route so that it knows which trucks are still in the warehouse, and which ones are on the road. In the course of its route, in addition to delivering its goods, a truck might refuel, or the driver might stop for lunch break. When such events occur, the driver logs the information in his handheld computer so that they can eventually be accounted for. In addition, a driver might receive a dispatch; this involves the truck returning to the warehouse to pick up the additional goods, and then resuming its itinerary. This operation also involves costs that are taken into account in the overall costing estimation.

All communications between embedded applications within the truck and the RFID readers, the I/O system and the GPS, occur through the network abstraction layer (NAL).

Once trucks have completed their routes, they come back to the warehouse. The driver who has completed a route uses his handheld computer to signal the route's completion to Operation Management. The handheld computer attempts uses the NAL (FIG. 11, item 4) send the completion message to the data processing infrastructure (FIG. 11, item 3). The message is then routed to the dispatching software. By the same token, the handheld computer will send its log to the Maintenance Management unit (FIG. 11, item C)—the log consists of all events pertaining to driver activity in the course of a route: refueling, lunch break, etc.

Then, network connectivity enables embedded applications (within trucks) to transmit their data to the corresponding applications within the company: the data pertaining to RPM, speed and transmission position is indirectly transmitted to the Maintenance Management unit (FIG. 11, item C), through the NAL and the data processing infrastructure.

In the case of the embedded inventory synchronization application, it simply sends the information pertaining to all load/unload data to the data processing infrastructure, by way of the NAL. The embedded application in addition sends its truck identifier. The centralized inventory application that is part of the Operation Management unit eventually recuperates the information. At that point, pieces of meat for which delivery has been confirmed have their corresponding record within the database updated appropriately.

As part of the synchronization procedure, the update client (that is integrated in the microkernel) embedded within each truck connects to the update server to detect and download any pending software updates. Such updates may be necessary due to changes in business rules, for example. In addition, the embedded applications can also pickup remote management commands that have been sent to them by way of the remote management infrastructure—and send back corresponding responses.

Solution

To determine the overall cost of managing the meat, the company must rely on the dispersed data that has been accumulated in various databases and information systems:

1. Each piece of meat is accounted for in the inventory database (in the Operation Management unit).
2. The meat inventory database eventually also contains the information concerning the arrival of each individual peace of meat at its destination. This information can be used to evaluate costs on a per-destination basis.
3. The dispatching software (in the Operation Management unit) contains the information pertaining to the start and completion of routes. This data can be correlated within the inventory database to actually determine of which route given pieces of meat where part, in order to properly distribute costs.
4. In addition, each piece of meat is kept in the refrigerator for a given amount of time, incurring costs pertaining mainly to electricity consumption. Information concerning these costs is gathered from the electricity consumption database. It can be correlated with the amount of time pieces of meat have been kept in the refrigerator, in order to properly distribute energy consumption costs.
5. The information kept in Operation Management pertaining to refueling, lunch breaks, working hours, etc., can be correlated with vehicle geographical data in order to evaluate the corresponding costs on a per-destination basis.

Cost evaluation thus typically involves cross-referencing data that has been kept in isolated silos. Generally, to perform such a task, the information integration framework (provided as part of the present invention) is used as follows:

a) each isolated database is abstracted as a source of XML documents;
b) the virtual sources of XML documents can be queried with precise criteria, using the XQuery language;
c) XQuery provides mathematical functions that can be used to post-process the data coming from each source. In addition, the acquired documents can be further aggregated, transformed and queried in order to produce completely synthetic information; and
d) In the context of this example, the end result is presented in the form of reports that display the meat management costs.

More concretely, the cost estimation routine takes into account the following data—for a given piece of meat:

| Item | Data source | Description |
| --- | --- | --- |
| Warehousing costs. | Operation Management (centralized inventory synchronization database and embedded inventory synchronization database). | The inventory database (both the centralized and the embedded counterparts) hold the time at which each piece of meat entered and left the refrigerator. |
| The route that the piece of meat was part of. | Operation Management (dispatching software). | This information can be obtained by correlating the start and end time of a route with the time at which a given piece of meat entered the truck and left it. The Accounting and Billing system can also be of use. |
| Transport costs | Operation Management (dispatching software), Maintenance Management. | The transport costs attributable to each route must be calculated in order to be distributed over each peace of meat that was part of the route. These costs take into account: fuel, driver salary and working hours (both of which can be obtained from Operation Management. |

-continued

| Item | Data source | Description |
| --- | --- | --- |
| Maintenance costs | Maintenance Management, Operation Management. | Maintenance costs include engine repairs, tire replacements, etc. Many of the expenses done in this area are driven by the data pertaining to the vehicle's usage (RPM, speed, etc.). The incurring maintenance costs must also be determined on a per-route basis. Thus, correlation with the dispatching software (in Operation Management) is necessary. |
| Destination Costs | Operation Management, Maintenance Management, Accounting and Billing. | Depending on the desired policy, costs can be distributed equally over all destinations, or they can be attributed on a per-destination basis. In the latter case, since data is geo-referenced for the most part, such costs can be evaluated by figuring out to what part of the route they belong. In addition, billing data provides further information as to what was delivered and where. |
| Driver costs | Operation Management | Driver costs pertain mainly to salaries and driver expenditures. |

The overall cost estimation process is detailed in the data flow diagram of FIG. 12. For the sake of simplicity, the process that is shown excludes costing evaluation on a per-destination basis (therefore, costs are distributed equally over all destinations). The data flow is described below:

1.1. The main process consists of making the cost estimation report that covers a given time period.
   1.1.1. In order to make the report, the appropriate data is collected from the required data sources.
   1.1.2. For each truck record, the route corresponding to the given truck is selected (a route corresponds to a truck, driver, and set of destinations, for a given time period). In addition, the meat inventory database is searched to find what pieces of meat were delivered by each truck.
   1.1.3. Then, the electricity consumption application is searched in order to find the total costs of the energy consumed in the covered time period. The costs will then be distributed attributed evenly over the appropriate pieces of meat (as found in the previous step).
   1.1.4. The next step consists of calculating the cost pertaining to drivers (consisting of salary and expenses).
   1.1.5. Similarly, the maintenance total costs (for the covered time period) pertaining to the vehicle that have made deliveries are also calculated.
1.2. With the data about the delivered pieces of meat and total costs (driver, maintenance, energy consumption), the average cost of the meat (pertaining to warehousing and transport) can be calculated. This can eventually be correlated with billing data (in the Accounting and Billing unit) in order to determine if pricing covers the costs.

Benefits

The above-described architecture benefits from the features of the present invention in many ways (as opposed to traditional solutions):
   a) all applications, whether in mobile or fixed assets, can be remotely deployed, updated and administered;
   b) multiple applications can be deployed on given assets;
   c) applications can connect intermittently to the network; they perform their tasks in an autonomous manner—a permanent connection is thus not necessary and incurs no data loss;
   d) applications are designed in such a way as to maximize the use of their processing power and storage capacity, sparing applications within the LAN from having to handle overwhelming amounts of data. This design also reinforces the autonomy of applications;
   e) the information integration framework is used to integrate heterogeneous data sources in order to produce information that feeds strategic decision-making. Data that is originally dispersed and unrelated becomes actionable information.

In the figures, specification and examples, there have been disclosed typical preferred embodiments of the invention and although specific terms are employed, they are used in a generic and descriptive sense only and not for purposes of limitation, the scope of the invention being set forth in the following claims.

What is claimed is:
1. A system for distributed asset management, said system comprising:
   a) a plurality of data-collecting devices, each device being associated with one of a plurality of distributed assets under management by said system, each device having a processor, a memory, and at least one sensor for collecting data about the asset with which the device is associated, wherein the processor is configured to execute one or more embedded applications that are configured to receive the data collected by the at least one sensor, process the data locally, save processed data in the memory, and then transmit the processed data, wherein each device comprises a microkernel for managing the embedded applications on the device;
   b) a centralized data-processing and remote management infrastructure for interacting with the plurality of devices via the microkernel on each device, the infrastructure comprising an update server adapted to interact with the microkernel to dynamically update embedded applications while the embedded applications are still executing; and
   c) a network abstraction layer that enables communication between the devices in the system and the centralized data processing and remote management infrastructure
wherein the update server is configured to hot-deploy an update to the embedded application on the device by downloading the update to the device and notifying the microkernel of the update, wherein hot-deploying comprises updating an existing embedded application using corresponding downloaded resources, and without terminating the operating system process.

2. The system of claim 1 wherein the embedded application is a hub application configured to interact with a proxy server that communicates with one or more micro-devices, wherein the micro-devices do not support microkernel installation.

3. The system of claim 1 wherein the centralized data processing infrastructure comprises an asynchronous messaging server software, a data cache and data processing applications.

4. The system of claim 1 wherein the at least one sensor of the device comprises a Global Positioning System receiver.

5. The system of claim 1 wherein the at least one sensor of the device comprises a Radiofrequency Identification sensor.

6. The system of claim 1 wherein each data-collecting device is configured to transmit the processed data over a cellular network to the centralized data processing and remote management infrastructure.

7. A method of managing distributed assets, said method comprising steps of:
a) receiving data from at least one sensor of a data-collecting device having a microkernel for managing an embedded application on the device, the device being installed in association with an asset to be monitored by the data-collecting device so as to be managed remotely by a centralized data-processing and remote management infrastructure;
b) locally processing asset-related data that is collected by the at least one sensor of the device;
c) storing processed data at the device;
d) transmitting the processed data to the centralized data processing and remote management infrastructure; and
e) hot-deploying an update to the embedded application on the device by downloading the update to the device and notifying the microkernel of the update, wherein hot-deploying comprises updating an existing embedded application using corresponding downloaded resources, and without terminating the operating system process.

8. The method of claim 7 further comprising transforming all data collected by the device into Extensible Markup Language documents.

9. The method of claim 7 further comprising installing a proxy server on the device to convert the device into a hub device for acting as an intermediary between the centralized data processing and remote management infrastructure and micro-devices that have no microkernel.

10. The method of claim 7 wherein transmitting the processed data comprises wirelessly transmitting the processed data over a cellular network to the centralized data processing and remote management infrastructure.

* * * * *